April 7, 1953   N. FORSLIN   2,633,878
STOCK FEEDER FOR LATHES-AND THE LIKE
Filed July 6, 1948
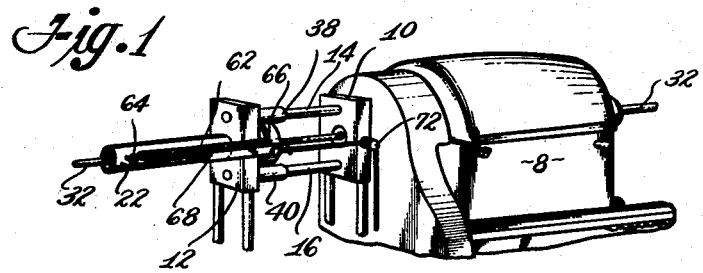
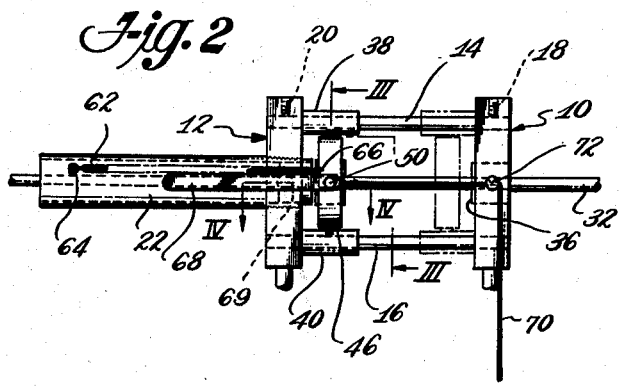
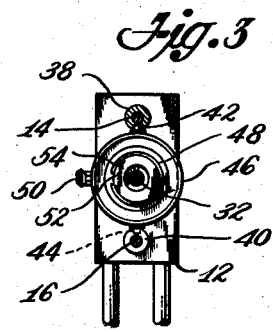
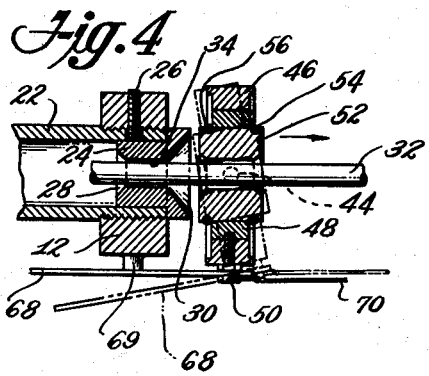
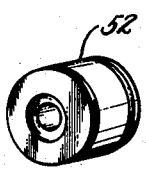
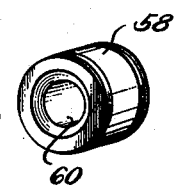
INVENTOR.
NELS FORSLIN
BY Harold W. Mattingly
Attorney Patented Apr. 7, 1953

2,633,878

UNITED STATES PATENT OFFICE 2,633,878

STOCK FEEDER FOR LATHES AND THE LIKE

Nels Forslin, Los Angeles, Calif.

Application July 6, 1948, Serial No. 37,165

2 Claims. (Cl. 140—130.1)

This invention relates to a bar or tube stock feeder for lathes, screw machines, and the like.

The main objects of this invention are to provide an improved form of bar or tube stock feeder; to provide a feeder which will handle a wide range of sizes of stock; to provide an improved stock feeder which, when in gripping engagement with the stock, will not scratch, score, or abrade the stock being fed; to provide a stock feeder which will handle square, hexagon or other polysided stock equally as well as round stock; to provide a stock feeder which will move the stock gently and snugly against a stop without causing the stock to bounce back, as is the case with most air or spring operated stock feeders; to provide a stock feeder which may be connected for either automatic or manual operation; and to provide a stock feeder of this character which is of simple construction, economical to manufacture, and which is sure and certain in its operation.

An illustrative embodiment of this invention is shown in the accompanying drawings, in which:

Fig. 1 is a view in perspective of the improved stock feeder attached to, or mounted upon, the headstock of a lathe or similar machine tool;

Fig. 2 is a view in side elevation of the improved stock feeder, with a bar of stock shown in position therein;

Fig. 3 is a sectional view taken on the line III—III of Fig. 2 looking in the direction indicated by the arrows;

Fig. 4 is an enlarged fragmentary sectional view taken on the line IV—IV of Fig. 2 looking in the direction indicated by the arrows;

Fig. 5 is a view in perspective of a stock feeding element for feeding stock of one range of sizes; and Fig. 6 is a similar view of a stock feeding element for feeding another range of sizes of stock.

In machining operations where it is necessary to feed bar or tube stock into the machine through the headstock in repeated and successive steps or increments, it has been customary to employ feeders for gripping the stock which are provided with jaws, clamps or the like for engaging the stock and moving it forward at each feeding movement. Such jaw-type feeders are capable of functioning on a very narrow range of sizes of stock, and therefore with each change of stock size it is usually necessary to also change the feeding jaws or elements of the stock feeder.

Furthermore, it is highly desirable to make successive feeds of stock without stopping the lathe or machine tool which is operating on the stock, and at the same time not score, scratch, or mar the stock being fed, and which marring or scratching results from relative rotation between the stock and the gripping elements which engage the stock for making the forward feed.

In the construction shown in the drawings, the headstock of a machine tool, generally designated 8, is shown provided with the improved stock feeder which may be mounted thereon or attached thereto in any convenient manner, depending upon the particular design of the machine tool to which the feeder is attached.

The improved stock feeder comprises a pair of horizontally spaced rectangular shaped end blocks 10 and 12 rigidly held in spaced parallel relation by rods 14 and 16, the ends of which are rigidly anchored in the blocks 10 and 12 by setscrews 18 and 20. The rods 14 and 16 are in spaced parallel relation at diammetrically opposite sides of central openings formed in the blocks 10 and 12, which openings are in axial alignment. The block 12 has its central opening interiorly threaded to receive the exteriorly threaded end of a tube 22. The tube 22 at its threaded end is adapted to receive a guide bushing 24 which has a snug slip-fit therein and is held securely by a setscrew 26 which passes through, and is threaded in, one wall of the block 12, and passes through a registering aperture in the threaded end of the tube 22. The opposite ends of the bushing 24 are counterbored as at 28 and 30 to facilitate the passing of bar stock 32 therethrough. For handling bar stock of ⅜" diameter and smaller, it is recommended that the opening 34 through the bushing 24 be 1½" in diameter.

The block 10 is also provided with a similar stock guide bushing 36 removably secured therein so that it may be readily changed for another bushing having a different opening therethrough for handling a different range of stock sizes.

The rods 14 and 16 serve also as sliding trackways for a pair of tubular sleeves 38 and 40 which are freely slidable thereon from one end to the other thereof between the blocks 10 and 12. The sleeves 38 and 40 are radially apertured to receive diametrically aligned outwardly extending trunnions 42 and 44, respectively, which are fixedly mounted at diametrically opposite points on an annular ring shaped holder 46. The holder 46 is provided with a bushing 48 of suitable bearing material which is anchored therein by the inner end of a cap screw 50 which is threaded through the holder 46 and into the outer surface of the bushing 48. The bushing 48 has a cylindrical inner bearing surface adapted to rotatably receive and journal any selected one of various feeder elements generally designated 52 in Fig. 4. The feeder elements 52 are provided with axially spaced exteriorly formed grooves in their outer surfaces adjacent their ends for receiving spring snap rings 54 and 56 which retain the elements within the bushing 48 while permitting free rotation therein. The element 52 illustrated in Fig. 4 is the same as that shown in Fig. 5, and for handling stock of ⅜" diameter or less, is preferably provided with a concentric opening therethrough of $\frac{15}{32}$" in diameter.

Another bushing generally designated 58, shown in Fig. 6 of the drawings, is provided with a concentric opening 60 therethrough of larger diameter for handling stock of larger size, but it will be understood that a relatively few sizes of guide bushings 24 and stock feeding elements 52 will handle a very large range of sizes of stock to be fed.

Means are provided for yieldingly maintaining the holder 46 and its feeding element 52 in a position at right angles to the axis of the stock 32— that is to say, normal with respect thereto—and comprises a helical tension spring 62 having one end anchored at 64 to the tube 22, and its other end secured at 66 to the marginal edge of the holder 46, the arrangement being such that the spring 62 functions to hold the feeder 46—52 at the end of the frame adjacent the block 12, and with the frame 46 normal to the axis of the bar stock 32. An arm 68 has one end apertured to receive the cap screw 50, the head of which bears thereagainst and holds the arm rigid with respect to the frame 46. The free end of the arm extending to the left as viewed in Figs. 1, 2, and 4 of the drawings rests against a shoulder formed on the frame block 12 for limiting pivotal movement of the frame 46 in a right-hand direction as viewed in Fig. 4 of the drawings, but permitting free rotation in a counterclockwise direction against the action of the tension spring 62. The head of the cap screw 50 is transversely drilled to receive an anchor one end of a pull cord 70 which extends forwardly through a guide 72 mounted on the frame block 10, and is connected to the collet closure and release lever so that the stock is fed each time the collet is opened.

In the operation of this device, bar or tube stock 32 is passed through the opening 34 of bushing 24, through the opening formed in the feeding element 52, through the opening formed through the bushing 36, and thence through the headstock of the machine tool to which the device is attached. The stock is usually shoved forward against an appropriate stop, at which time the stock is gripped by the machine tool and work done upon it.

When the collet control lever is moved by the operator to release the collet, the pull cord 70, being connected thereto, is also pulled. As the tension of the spring 62 is overcome, the frame 46 and its feeding element 52 are rocked or rotated about the pivotal mountings formed by the trunnions 42 and 44, thus causing a cramping of the stock at diametrically opposite sides by reason of engagement of the diagonally opposite ends of the walls forming the opening through the feeding element 52. As the stock is gripped by the cramping action, if the stock is rotating, then the feeding element 52 will rotate freely with the stock and thus cause no scoring, scratching, or marring of the stock. Further pull on the cord 70 will slide the frame 46 with its rotating element 52 to the right as viewed in the drawings by reason of the sleeves 38 and 40 sliding on the rods 14 and 16 to the position shown in broken lines in Fig. 2, or to any intermediate position. When the stock has been fed forward against its usual stop, the cord 70 is released as the collet control lever is moved to close the collet, whereupon the tension spring 62 will rock or rotate the frame 46 in a clockwise direction as viewed in Fig. 4 until the stiff arm 68 contacts the boss 69 on frame 12, at which time the frame will be normal to the axis of the stock being fed, and will have completely released any contact therewith, due to the opening through the feeding element 52 being slightly larger than the openings through the guide bushings 24 and 36. Thereupon, the spring 62 will further function to return or retract the feed assembly to the position shown in full lines in Figs. 1 and 2 and thus be in a position to again feed the stock forward when it is desired.

While I have shown and described a presently preferred embodiment of my invention, I do not desire to be limited to any of the details shown and described herein, except as defined by the terms of the appended claims.

I claim:

1. A stock feeder of the class described comprising a frame adapted to be attached to a lathe or similar machine tool; a stock feeder element pivoted on said frame, said element having an opening therethrough for receiving the stock being fed, said opening being sufficiently larger than the stock to permit pivotal movement of the element with resultant gripping engagement of the stock at opposite sides thereof at diagonally opposite ends of the opening; means slidably mounting said element on said frame for movement parallel to the axis of the stock being fed; means including yielding means for normally maintaining said element in a non-gripping position with its opening parallel to the axis of the stock being fed; and a manually operated member connected to the element for rocking said element on its pivotal mounting against the action of said yielding means for gripping the stock and simultaneously sliding said element to feed the stock while engaged thereby, said yielding means functioning to return said element to its original position upon termination of the manual tilting and sliding feeding operation.

2. A stock feeder of the class described comprising a frame adapted to be attached to a lathe or similar machine tool; a stock feeder element pivotally supported by said frame, said element comprising an annulus for receiving and encompassing the stock being fed; said annulus having an opening sufficiently larger than the stock to permit pivotal movement of the element with resultant gripping engagement of the stock at opposite sides thereof at diagonally opposite ends of the opening; a carrier for said element slidable on said frame for movement parallel to the axis of the stock being fed; an abutment device on said frame and limiting movement of said element in one direction on said frame, said abutment having a surface contacted by said element which is in a plane perpendicular to the line of sliding movement of said element, the contacting surface of said element being in a similar plane, whereby the opening will be aligned with the axis of stock to be fed; a manual actuator connected to said element for rocking it on its pivotal mounting to grip the stock and simultaneously slide the element to feed the stock while engaged by the element; and a yieldable return device for said element, said return device yieldably urging the element into contact with said abutment to return said element from its stock feeding stroke and also to mount said element in a neutral non-feeding position when the manual actuator is released.

NELS FORSLIN.

REFERENCES CITED

The following references are of record in the file of this patent:

UNITED STATES PATENTS

| Number | Name | Date |
|---|---|---|
| 2,169,107 | Martin | Aug. 8, 1939 |
| 2,170,942 | Evasic | Aug. 29, 1939 |
| 2,187,089 | Martin | Jan. 16, 1940 |
| 2,216,872 | Baxendale | Oct. 8, 1940 |
| 2,218,402 | Martin | Oct. 15, 1940 |
| 2,355,866 | Ingalls | Aug. 15, 1944 |
| 2,368,890 | Sherrow | Feb. 6, 1945 |
| 2,389,913 | Kasper | Nov. 27, 1945 |